(12) United States Patent
Yoshida et al.

(10) Patent No.: US 6,966,858 B2
(45) Date of Patent: *Nov. 22, 2005

(54) TENSIONER

(75) Inventors: Osamu Yoshida, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 159 days.

This patent is subject to a terminal disclaimer.

(21) Appl. No.: 10/621,135

(22) Filed: Jul. 16, 2003

(65) Prior Publication Data

US 2004/0029665 A1  Feb. 12, 2004

(30) Foreign Application Priority Data

Aug. 8, 2002 (JP) ............................. 2002-231831

(51) Int. Cl.$^7$ ................................................ F16H 7/08

(52) U.S. Cl. ...................... 474/109; 474/110; 474/111; 474/117

(58) Field of Search .................. 474/109–111, 140, 474/117

(56) References Cited

FOREIGN PATENT DOCUMENTS

| EP | 1188955 A1 | * | 3/2002 | ............. F16H 7/08 |
|----|------------|---|--------|------------------------|
| EP | 1 319 868 A2 | | 6/2003 | |
| EP | 1319868 A1 | * | 6/2003 | ............. F16H 7/08 |
| EP | 1323950 A1 | * | 7/2003 | ............. F16H 7/08 |
| GB | 2 389 404 A | | 12/2003 | |
| JP | 01-229152 A | * | 9/1989 | ................. 474/110 |
| JP | 2000-136861 A | * | 5/2000 | ............. F16H 7/08 |
| JP | 2003-194165 A | * | 7/2003 | ............. F16H 7/08 |

* cited by examiner

Primary Examiner—Marcus Charles
(74) Attorney, Agent, or Firm—Howson and Howson (57) ABSTRACT

A chain tensioner comprising a housing, a plunger having racks formed on its opposite sides, a protrusion biasing spring, cams arranged in oblique guide grooves in the housing and engageable with the racks of the plunger, and a spacer supporting a cam biasing spring. The minimum backlash distance X is equal to $h/\tan \theta$, where h is the height of the rack teeth, and $\theta$ is the angle of the cam guide surfaces relative to the protruding direction of the plunger. The angle $\theta$ is between 15° and 70°. The tensioner prevents wobbling noises produced by a timing chain on starting an engine, prevents whistling sounds due to excess tensioning of the chain, and allows backlash to be readily set to accommodate the requirements of a wide variety of engines.

6 Claims, 8 Drawing Sheets

TENSIONER

FIELD OF THE INVENTION

This invention relates to a tensioner for maintaining proper tension in an endless, flexible, power transmitting medium such as a drive chain or drive belt. The tensioner has utility, for example, in maintaining tension in the timing chain of an internal combustion engine, where the chain transmits power from a crankshaft sprocket to one or more camshaft sprockets.

BACKGROUND OF THE INVENTION

In a conventional tensioner, a plunger, protruding from a housing, exerts a force on the back of a pivoted tensioner lever having a shoe in sliding contact with the slack (return) run of a chain in order to maintain tension in the chain. The plunger of the tensioner engages the lever at a location remote from the pivot axis of the lever.

Figure 8:
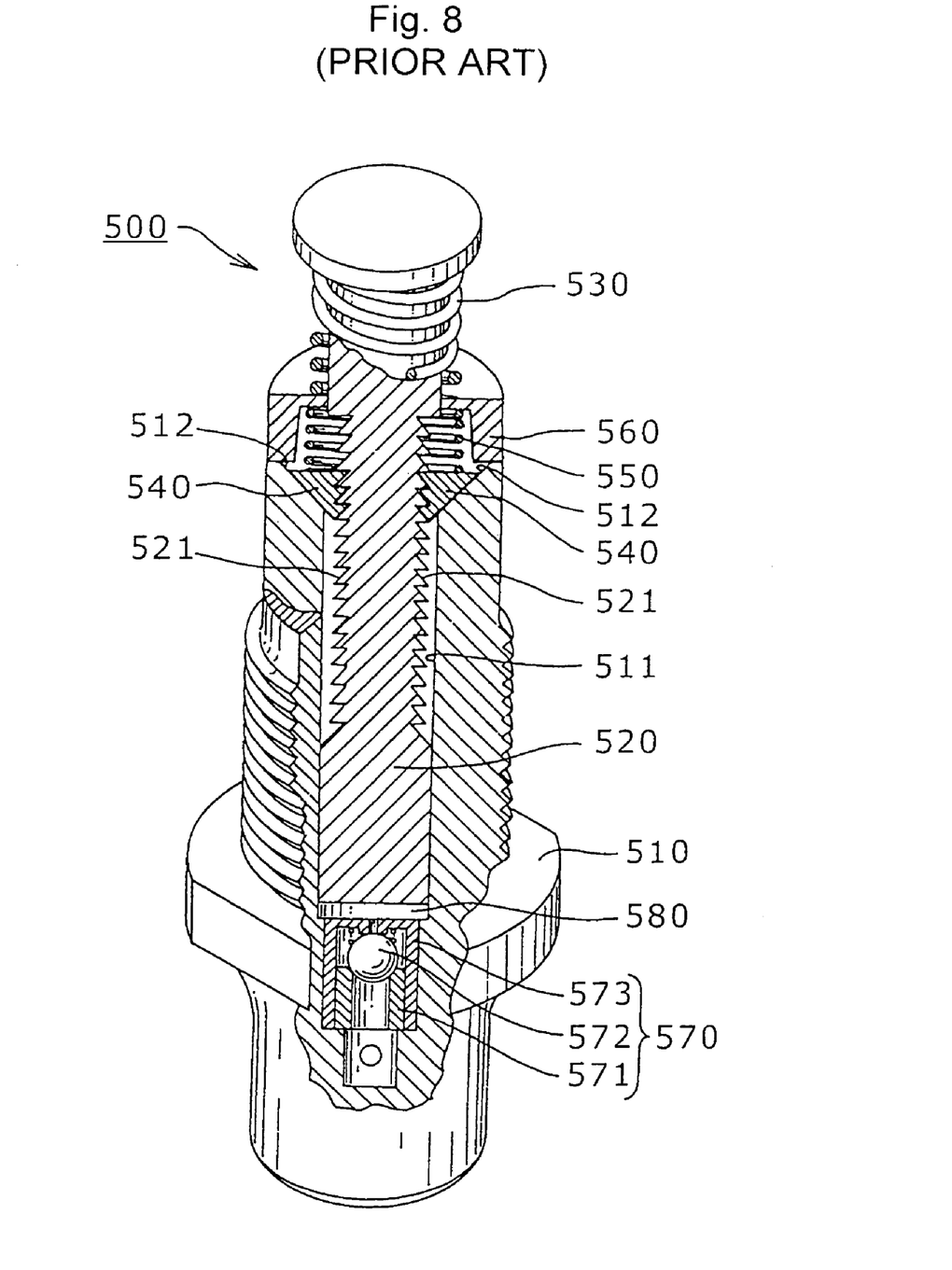
FIG. 8 is a perspective view, partly in section, of a tensioner which we previously developed.

A chain tensioner which we have developed is depicted in FIG. 8. As shown in FIG. 8, the tensioner 500 comprises a plunger 520, which protrudes retractably from a plunger-receiving hole 511 in a housing 510. A biasing spring 530, biases the plunger 520 in the protruding direction. Wedge-shaped cam chips 540, which slide in sloped guide grooves 512 formed at the open front end of the plunger-receiving hole 511, engage racks 521 formed on opposite sides of the plunger 520. At least two cam chips are provided. A cam-biasing spring 550 loosely fitting on the plunger 520, biases the wedge-shaped cam chips 540, pushing them into the plunger-receiving hole 511. The outer end of the cam-biasing spring 550 bears against an inwardly projecting flange of a spacer 560 secured to the front end of the housing 510.

As a chain becomes elongated during use, the chain tensioner 500 controls backlash by allowing the plunger 520 to proceed sequentially, one tooth at a time in the projecting direction. In this way, the tensioner maintains appropriate chain tension, and prevents foreign noise upon starting of the engine, and whistling sounds which occur as a result of excess chain tension.

In the design of the chain tensioner 500, the backlash distance was not particularly considered, foreign noises were generated due to wobbling of the chain upon starting the engine, and hewing sounds were generated during excess tensioning of the chain. These problems often arise due to the fact that the setting of the backlash distance is not matched to the individual engines. When the backlash distance is relatively large, the wobbling sounds due to wobbling of the chain are liable to occur upon starting of the engine, and when the backlash distance is relatively small, the plunger 520 protrudes excessively, and hewing sounds due to excess tensioning of the chain are likely to occur.

The backlash distance also changes before and after the cam chips 540 step from one tooth of the rack 521 to another. When the backlash distance, just before the cam chips 540 step from one tooth to another, is set to a maximum, and the backlash distance just after the cam step from one tooth to another is set at a minimum, the balance between the maximum and minimum backlash distances has a significant effect on the above-mentioned foreign noise.

Adjusting the backlash distance by changing the design of the tooth length or height of the racks on the plunger 520 was tried in order to solve these problems. However, wear occurred in the cam chips 540 and in the rack 521, and chipping of the teeth was experienced due to poor tooth strength.

Restrictions in the design of the rack limited the adjustability of the backlash distance to an extremely narrow range so that the tensioner could not be applied to a wide variety of engines. As a result wobbling sounds from the chain, and whistling sounds due to excess protrusion of the plunger occurred.

Accordingly, objects of the invention include the solution to the above-described problems, and the provision of a chain tensioner which can prevent wobbling noises of the chain upon starting of and engine and whistling sounds due to excess tensioning of the chain, which can maintain appropriate chain tension, and in which the amount of backlash can be set to accommodate a wide variety of engines.

SUMMARY OF THE INVENTION

The tensioner in accordance with the invention comprises a housing having a plunger-receiving hole, said hole having an opening, a plunger slidably fitting into the plunger-receiving hole and protruding from the opening thereof in a protruding direction. A first spring biases the plunger in the protruding direction. Toothed racks are formed on opposite sides of the plunger, and each of a pair of wedge-shaped cams on opposite sides of the plunger is disposed adjacent one of the respective toothed racks, each cam having teeth lockingly engageable with teeth of the adjacent one of the racks to prevent retracting movement of the plunger relative to the cams. Each cam has an oblique surface for engagement with a guide surface, the oblique surface of each cam facing outwardly away from the plunger. The shape of each oblique surface is such that the oblique surface has an outer end disposed farther along the protruding direction than an inner end thereof. A pair of oblique cam guide surfaces are formed in the housing on opposite sides of the plunger, the oblique surfaces of the cams conforming to, and being in engagement with the oblique cam guide surfaces and slidable thereon to an extent such that the teeth of the cams can be brought into and out of locking engagement with the teeth of the toothed racks. A spacer is disposed on the housing adjacent said opening, and a second spring is engaged with the spacer and the cams, to urge the cams in a direction opposite to the protruding direction so that the cams are urged into locking engagement with the toothed racks. The tensioner is characterized by the fact that, when the teeth of said racks have a height h, the angle between the oblique cam guide surfaces and the direction of protrusion of the plunger is $\theta$, the minimum backlash distance of the plunger is X, the cam guide surfaces conform to the relationship $X = h/\tan\theta$, and the angle $\theta$ is between 15° and 70°. That is, $15° < \theta < 70°$.

Preferably, the first spring, which is the plunger-biasing spring, is interposed between the front end portion of the plunger and the spacer.

Also, the spacer is preferably pressed by the first spring against the front end of the housing surrounding the opening of the plunger-receiving hole.

The term "maximum backlash distance Y" refers to the distance through which the plunger travels in the retracting direction, from a position immediately preceding the position at which, after the cams have ascended the slopes of the oblique cam guide surface, the engagement between the cams and the racks of the plunger is released, to the position in which the plunger returns to the farthest retracted position permitted by the cams. The term "minimum backlash distance X" refers to the distance through which the plunger travels when returning from the position immediately following the position at which the cams disengage the rack teeth and step by one tooth, to the farthest retracted position permitted by the cams.

The invention is applicable both to an "inner mounting" tensioner in a sealed condition inside an engine, and to an "outer mounting" tensioner mounted outside an engine. Furthermore, the tensioner in accordance with the invention is applicable not only to a timing chain transmitting power from a crankshaft sprocket to one or more camshaft sprockets, but also to other chains, such as a chain in a balancer system, or a drive chain in an oil pump system. Furthermore, the tensioner of the invention can be also applied to a drive belt.

In the operation of the tensioner in accordance with the invention, as a chain becomes elongated during engine operation, an appropriate backlash distance is always controlled as a result of the sequential proceeding of the plunger in the protruding direction, by one rack tooth at a time. Appropriate chain tension is maintained, so that foreign sounds, and whistling sounds generated during excessive tensioning of the chain, are prevented.

The tensioner according to the invention includes a plunger, which protrudes in a direction to apply tension to a traveling flexible transmission medium, a housing having a plunger-receiving hole, and a biasing spring which biases the plunger in the protruding direction with respect to the housing. Thus, when the traveling transmission medium loosens by elongation, the plunger, which is biased in the protruding direction by the biasing spring, is moved forward rapidly.

The wedge-shaped cams slide on the oblique guide surfaces, and are continuously urged axially, by the cam-biasing spring, in the retracting direction of the plunger. As a result, the cams are pushed inward, toward the plunger axis, into the plunger-receiving hole. As the plunger moves in the protruding direction, the cams slide on the slopes of oblique cam guide surfaces, and ascend thereon until the engagement between the cams and the racks of the plunger is released. Then, at the moment when the engagement between the cams and the racks is released, the rack teeth of the plunger step over the cam teeth by the distance of one tooth. The cams are thereupon instantaneously pushed back into the plunger-receiving hole so that they exert a wedge action, blocking backward displacement of the plunger.

Since the wedge-shaped cams engage racks on opposite sides of the plunger, when the cams block the backward displacement of the plunger, the force exerted by the plunger is dispersed to both cams, and therefore the force acting on each cam is relatively small.

When the shape of the oblique cam guide surfaces is such that the minimum backlash distance X conforms to the equations $X=h/\tan\theta$ and $15°<\theta<70°$, the backlash distances required for various engines could be set freely and in a wide range in the above-mentioned range of $\theta$. As a result wobbling noise of the chain at the start of engine and whistling sound, which is generated during excess tensioning of the chain, can be prevented.

When the slope angle $\theta$ of the oblique cam guide surfaces is smaller than 15°, a tooth head of the cam is liable to engage a tooth head of the rack, and tooth chipping, or locking of the cam to the rack, are liable to occur. On the other hand, when the slope angle $\theta$ is larger than 70°, the movement of the cams become dull, and the wedge action of the cams on the plunger is insufficient.

DETAILED DESCRIPTION OF THE PREFERRED EMBODIMENTS

Figure 1:
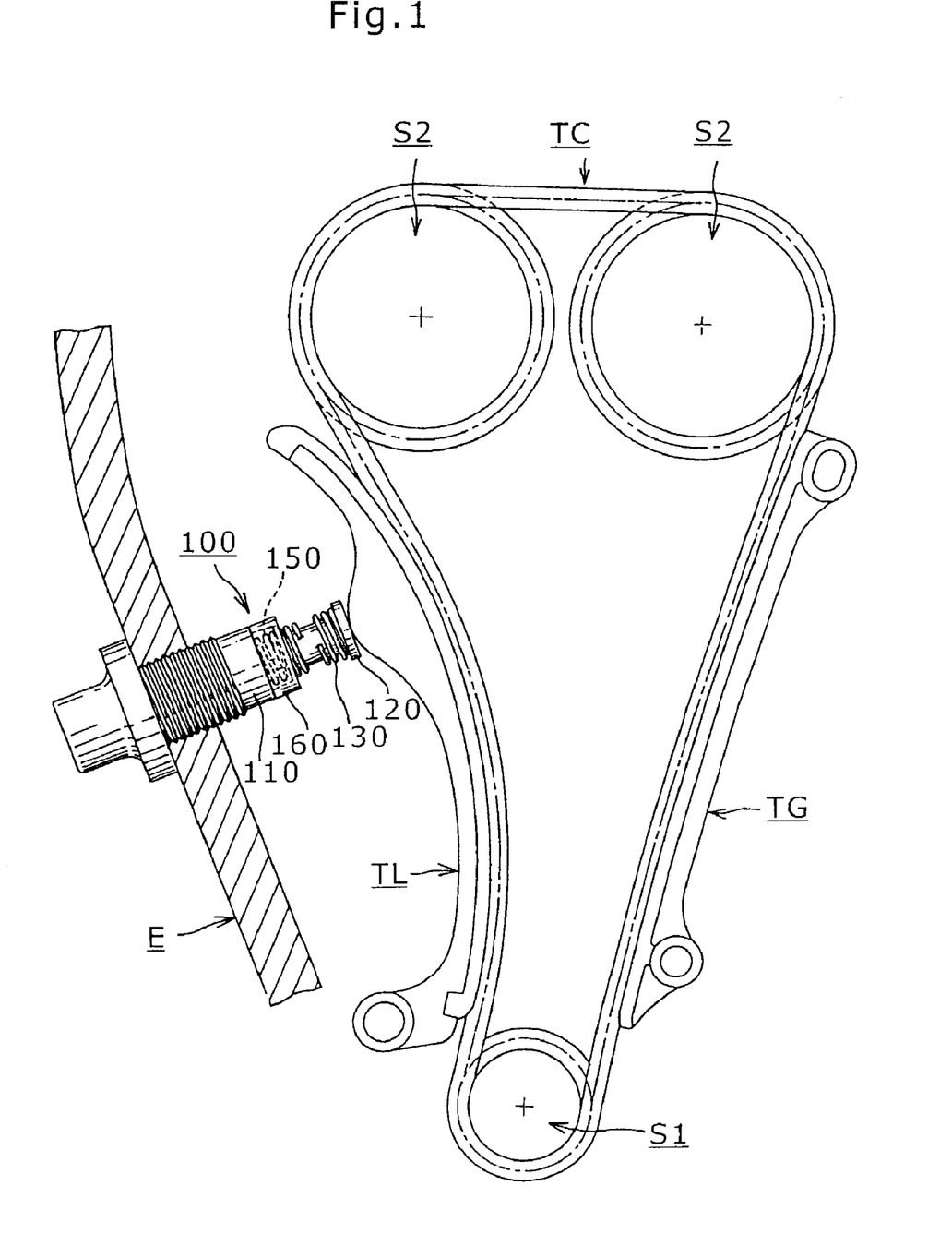
FIG. 1 is an elevational view of a timing transmission of an internal combustion engine, showing how a tensioner, according to the invention maintains tension in a timing chain.

The tensioner 100, as shown in FIG. 1, is used as an outer attachment type chain tensioner, to maintain tension in, and suppress the vibration generated during the traveling of, a timing chain TC, trained between a crankshaft sprocket S1 and camshaft sprockets S2 of a vehicle engine. In the chain tensioner 100, a spring-biased plunger 120 protrudes toward the timing chain TC, which travels in front of the tensioner housing 110, which is attached to an engine block wall E. The plunger presses the back surface of a tensioner lever TL, pivotally supported on the engine block, urging a shoe surface of the tensioner lever TL into sliding contact with the slack side of the timing chain TC to impart tension to the chain.

A tensioner guide TG, fixed to the engine block, guides the timing chain TC to prevent the chain from wobbling.

Figure 2:
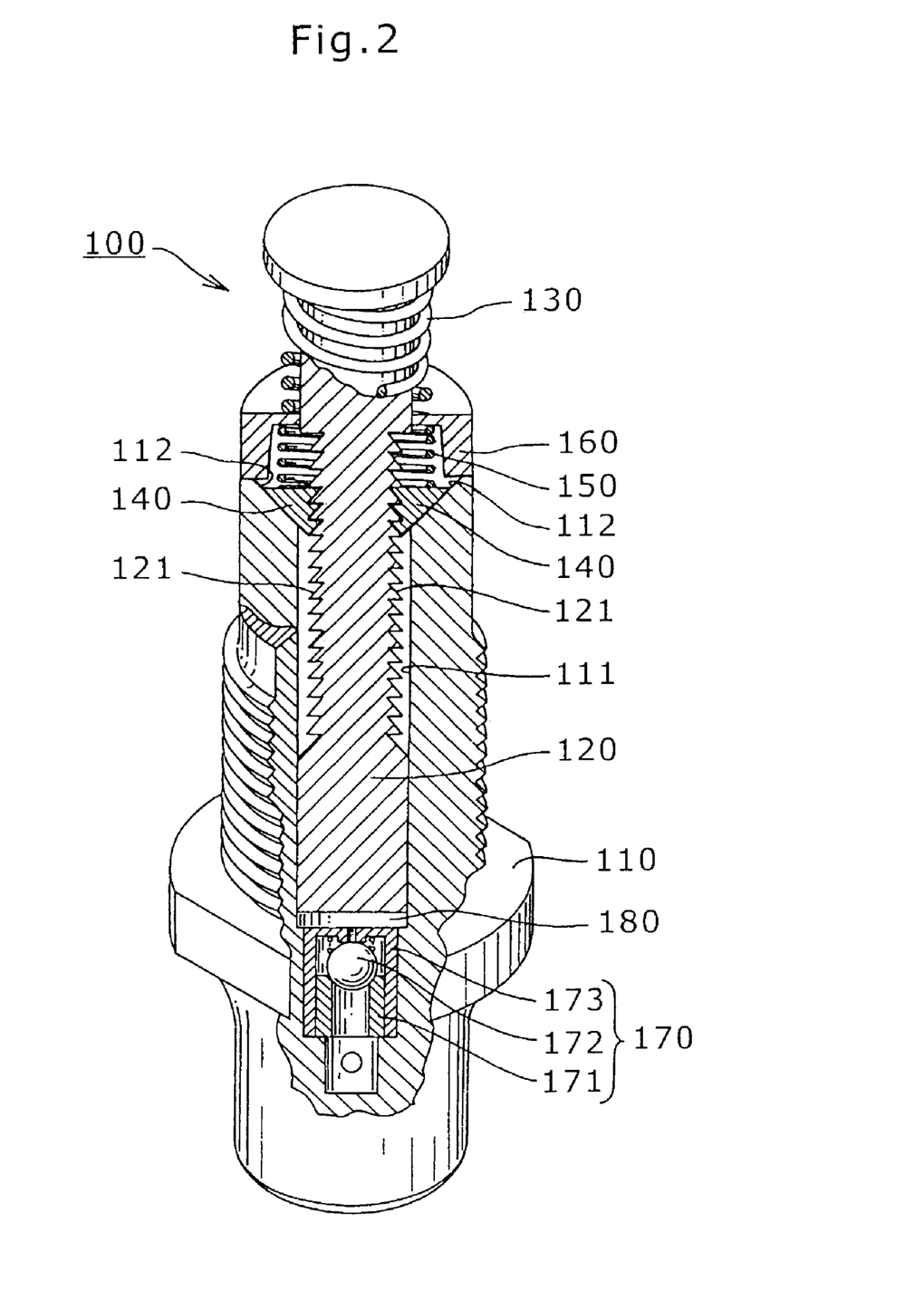
FIG. 2 is a perspective view, partly in section, of the tensioner shown in FIG. 1.
Figure 3:
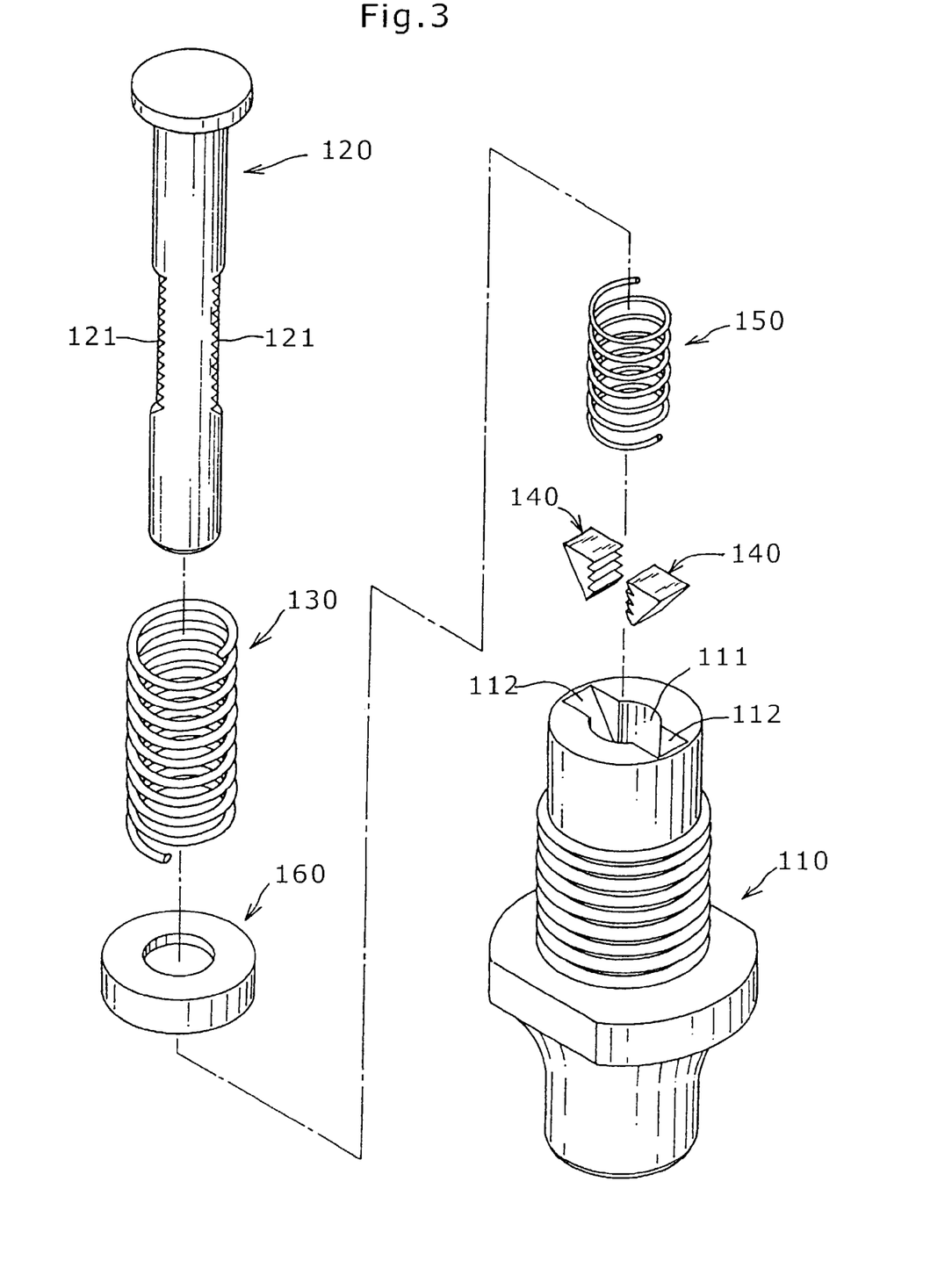
FIG. 3 is an exploded perspective view showing the assembly of the tensioner of FIG. 1.
Figure 4:
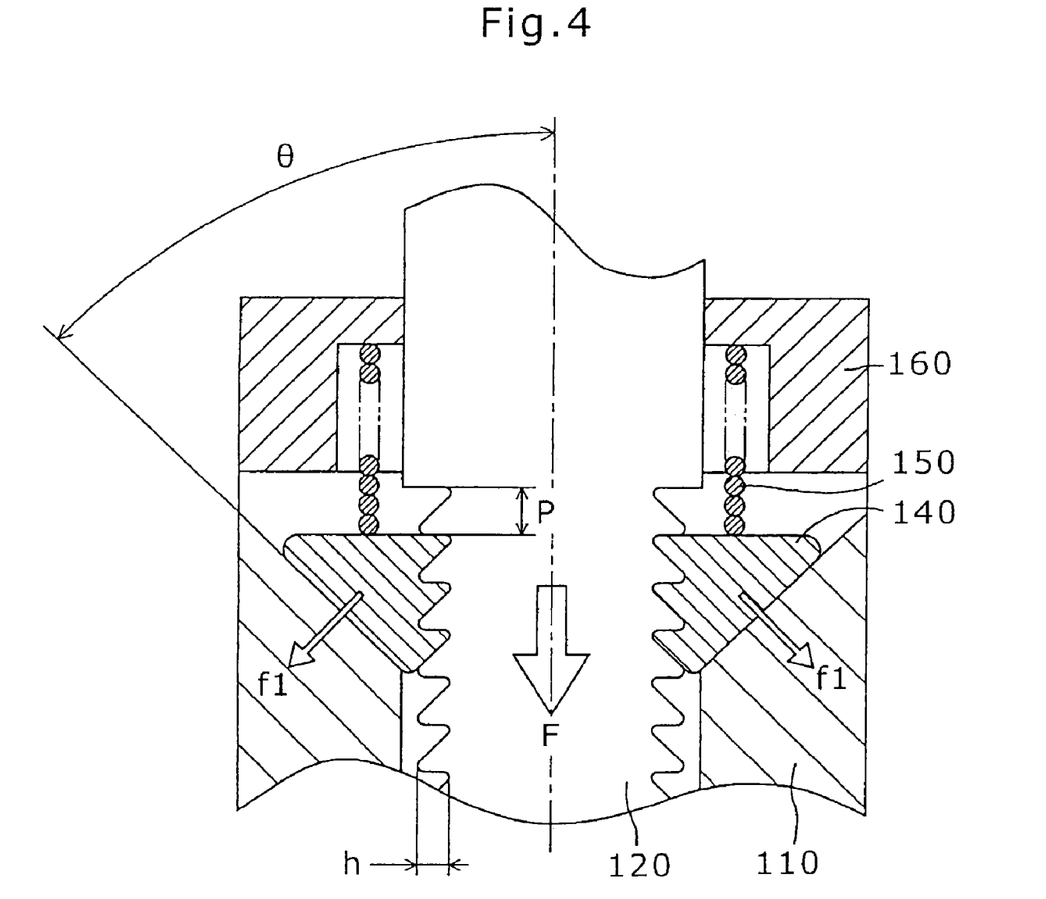
FIG. 4 is an explanatory sectional view showing details of the relationship between the cams and plunger racks, and illustrating the slope angle $\theta$ of the oblique cam guide surfaces.

As shown in FIGS. 2 to 4, the chain tensioner 100 comprises a housing 110, having a plunger-receiving hole 111 into which a plunger 120 is inserted. A protrusion biasing spring 130, biases the plunger 120 in the protruding direction with respect to the housing 110. Two wedge-shaped cams 140 slide on oblique cam guide surfaces 112, formed at the front end of the housing on both sides of the opening of the plunger-receiving hole 111. These cams have teeth which engage teeth of two racks 121 formed on opposite sides of the plunger 120. A cam-biasing spring 150 fits loosely on the plunger 120, and biases the wedge-shaped cams 140 against the oblique guide surfaces, in the direction opposite to the protruding direction of the plunger. The action of the oblique guide surfaces causes the cams to be biased inwardly, toward the plunger axis, into the plunger-receiving hole 111. A spacer 160 arranged to abut the front end of the housing surrounding the plunger-receiving hole 111, engages the end of the cam-biasing spring 150 opposite from the end which contacts the cams.

The plunger 120 is generally in the form of a cylinder, which fits the plunger-receiving hole of the housing, except that the racks 121 are respectively formed at opposed positions on the plunger 120 so that the outer circumference of the plunger is divided into two parts. Accordingly, by rotating the cylindrical plunger 120 about its axis through 90 degrees with respect to the housing 110, the racks 121 can be engaged with, and disengaged from, the cams. Thus, the device can be assembled easily, and the engagement between the racks 121, and the cams 140 can be released easily, while the tensioner is mounted on and engine, for maintenance of a timing chain.

The rear end of the housing 110 is provided with a hydraulic valve mechanism 170 for causing oil pressure, from an external oil supply source (not shown), to act on a rear end portion of the plunger 120, in order to adjust the protrusion biasing force of the plunger 120 accurately. This hydraulic valve mechanism 170 comprises a ball seat 171, press-fit into a retainer 173, a check ball 172, which freely abuts the ball seat 171. The retainer 173 holds this check ball 172. In the hydraulic valve mechanism 170, oil is allowed to flow into a high pressure oil chamber 180 defined by the walls of the plunger-receiving hole 111 and the rear end portion of the plunger 120. However, reverse flow of oil from the high pressure oil chamber 180 is blocked, so that chain tension is accurately imparted and maintained through the plunger 120.

The strength of teeth of the cam 140 and the rack 121 depends on the tooth height h as shown in FIG. 4, and the pitch of the teeth. The backlash distance can be controlled by changing the tooth height h of the rack 121. When the tooth height h is increased, tooth chipping due to poor strength is generated, and when the tooth height h is decreased, the tooth head is liable to wear. Thus, there is a restriction in the design of the rack teeth and the cam teeth.

In the chain tensioner 100 the retraction-stopping function is controlled by paying attention to the slope of the oblique cam guide grooves 112 of the housing 110, without depending on a tooth length in the plunger 120. That is, when the minimum backlash distance for the plunger 120 is defined as X, the tooth height in the rack 121 is h, and the angle of the oblique cam guide surfaces 112 with respect to the protruding direction of the plunger 120 is defined as θ, the shape of the cam guide surfaces 112 is formed so as to satisfy the relation ships X=h/tan θ, and 15°<θ<70°.

When the slope angle θ of the sloped cam guide groove 112 is smaller than 15°, a tooth head of the cam chip 140 is liable to contact a tooth head of the rack 121 whereby tooth chipping and excessive locking are liable to occur. On the other hand, when the slope angle θ is larger than 70°, the movement of the cams 140 become dull, and the wedge action of the cams on the plunger 120 is not effectively exerted.

As described above, by setting the slope angle θ to a value within the range 15°<θ<70°, the backlash distances required in various engines can be controlled easily. As a result, proper chain tension can be maintained without generating chain wobbling noises upon starting of the engine, and whistling sounds resulting from excess tensioning of the chain.

There is a relationship, Y=X+P, between the minimum backlash X, the maximum backlash Y, of the plunger 120, and the rack pitch P. The minimum backlash distance X can be made constant irrespective of the value of the rack pitch P. Accordingly, the maximum backlash distance Y can be controlled by the rack pitch P. Therefore, since the balance between the maximum and minimum distances, which influence the above-described foreign sounds generated upon starting of engine, can be controlled by changing the rack pitch P, the chain tensioner can be applied to engines having various properties.

In the tensioner 100, when a traveling timing chain TC loosens, the plunger 120, biased by the protrusion biasing spring 130, advances immediately. That is, when the plunger 120 advances in a direction to increase tension in the traveling timing chain TC, the racks 121 are apt to draw the cams 140 out of the plunger-receiving hole 111 in the protruding direction as shown in FIG. 6. However, since the cams 140 are biased axially by the cam biasing spring 150, the cams slide on the oblique cam guide surfaces 112 and ascend thereon until the engagement of the cams 140 with the racks 121 of the plunger is released as shown in FIG. 6. Line L1 in FIG. 5 shows the position of the front end of the plunger 120 when in the fully retracted condition.

Figure 6:
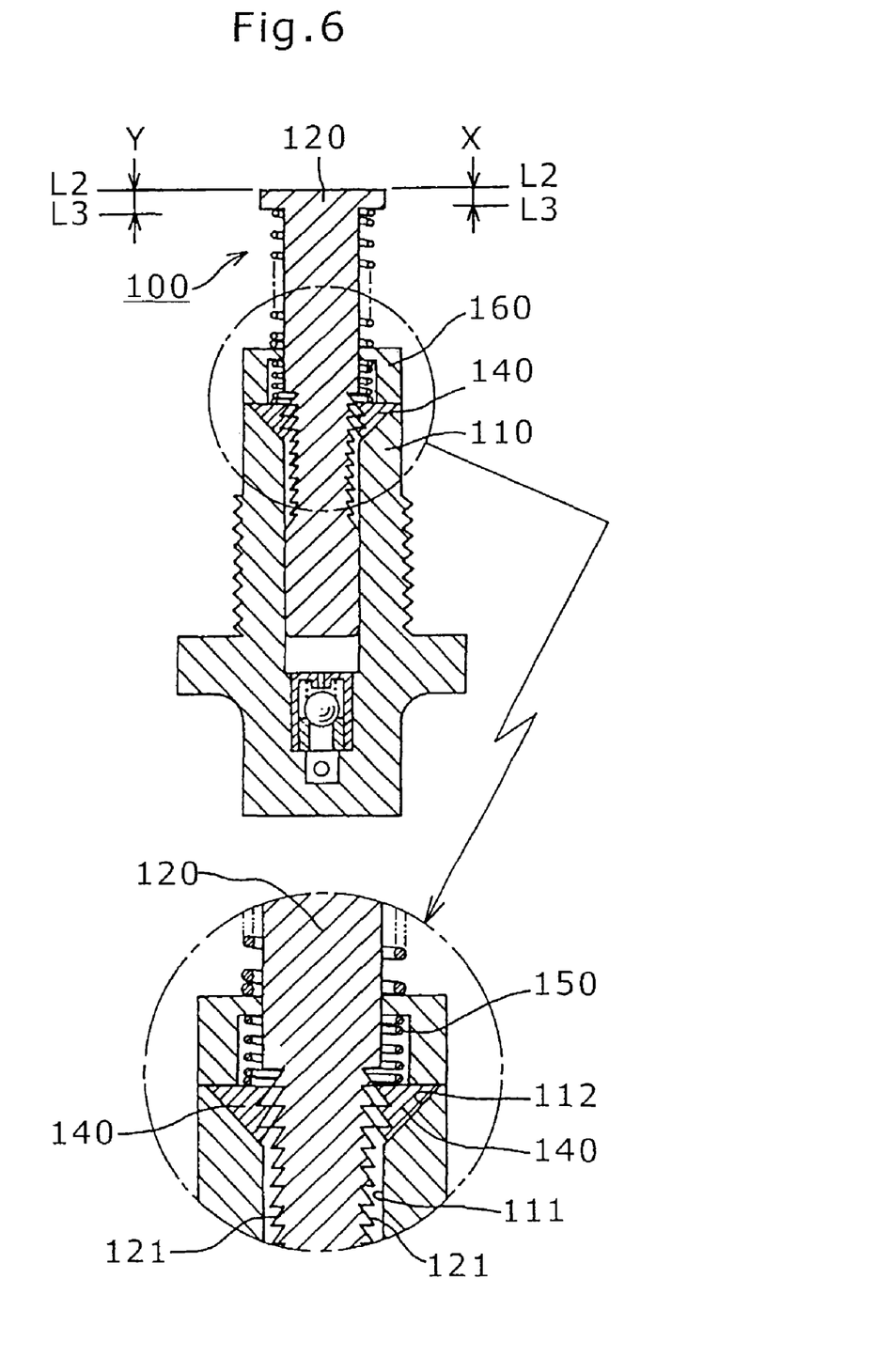
FIG. 6 is a sectional view showing the condition of the cams immediately preceding their stepping over the teeth of the plunger racks.
Figure 7:
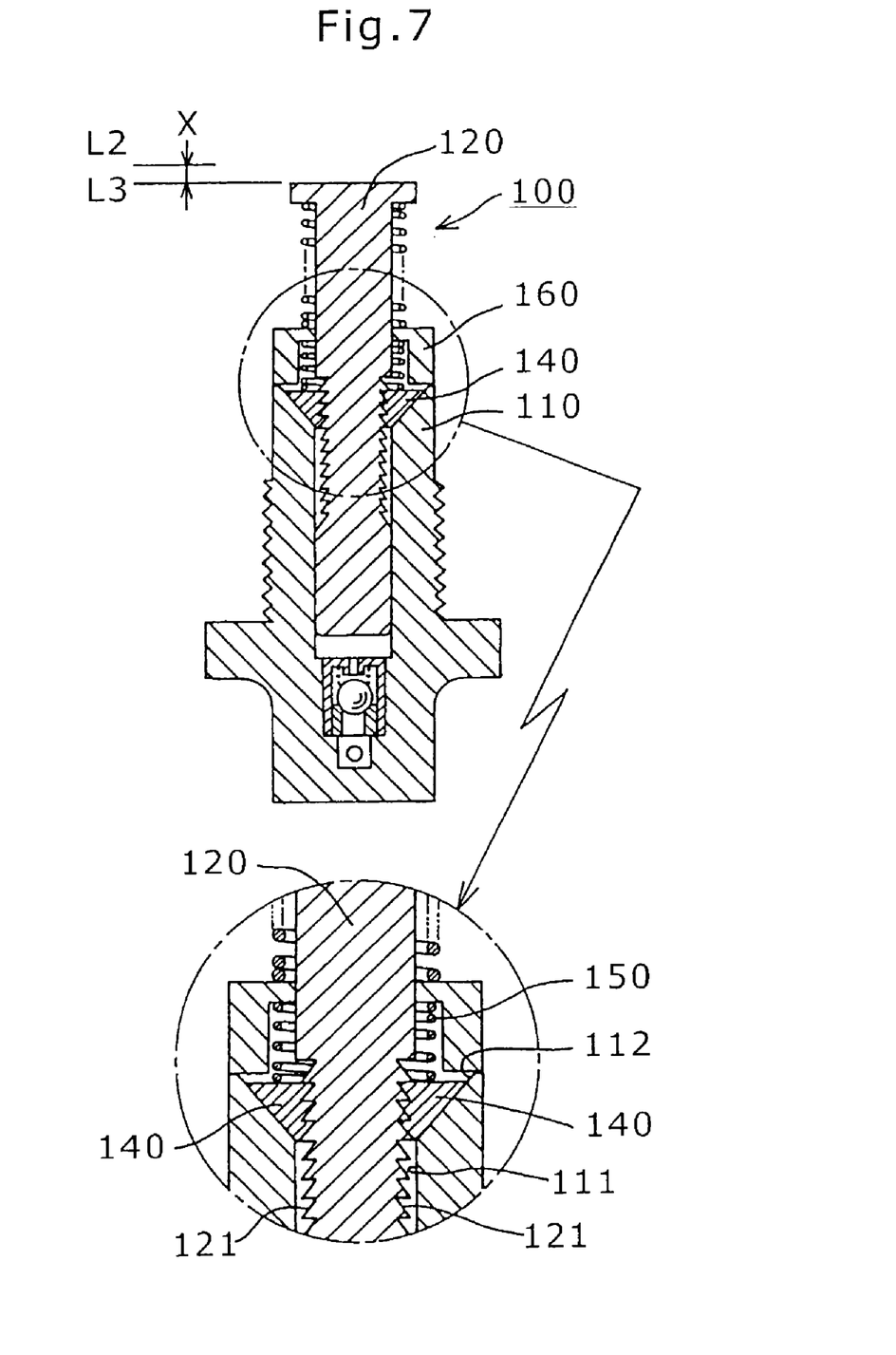
FIG. 7 is a sectional view of the tensioner, showing the plunger in its retracted position after having advanced by one tooth.

Then, as shown in FIG. 6, when the wedge-shaped cams 140 ascend on the oblique cam guide surfaces 112, the engagement of the cams with the racks 121 is released, and the plunger advances by one tooth on each of the racks 121. As shown in FIG. 7, the cams 140 are instantaneously pushed into the plunger-receiving hole 111, and exert a wedge action on the plunger 120, blocking backward displacement of the plunger.

As shown in FIG. 4, the force F, exerted on the cams by plunger 120 is dispersed as forces f1 and f2 on opposite sides of the outer circumference of the plunger, so that the forces acting on each of the cams is reduced.

Figure 5:
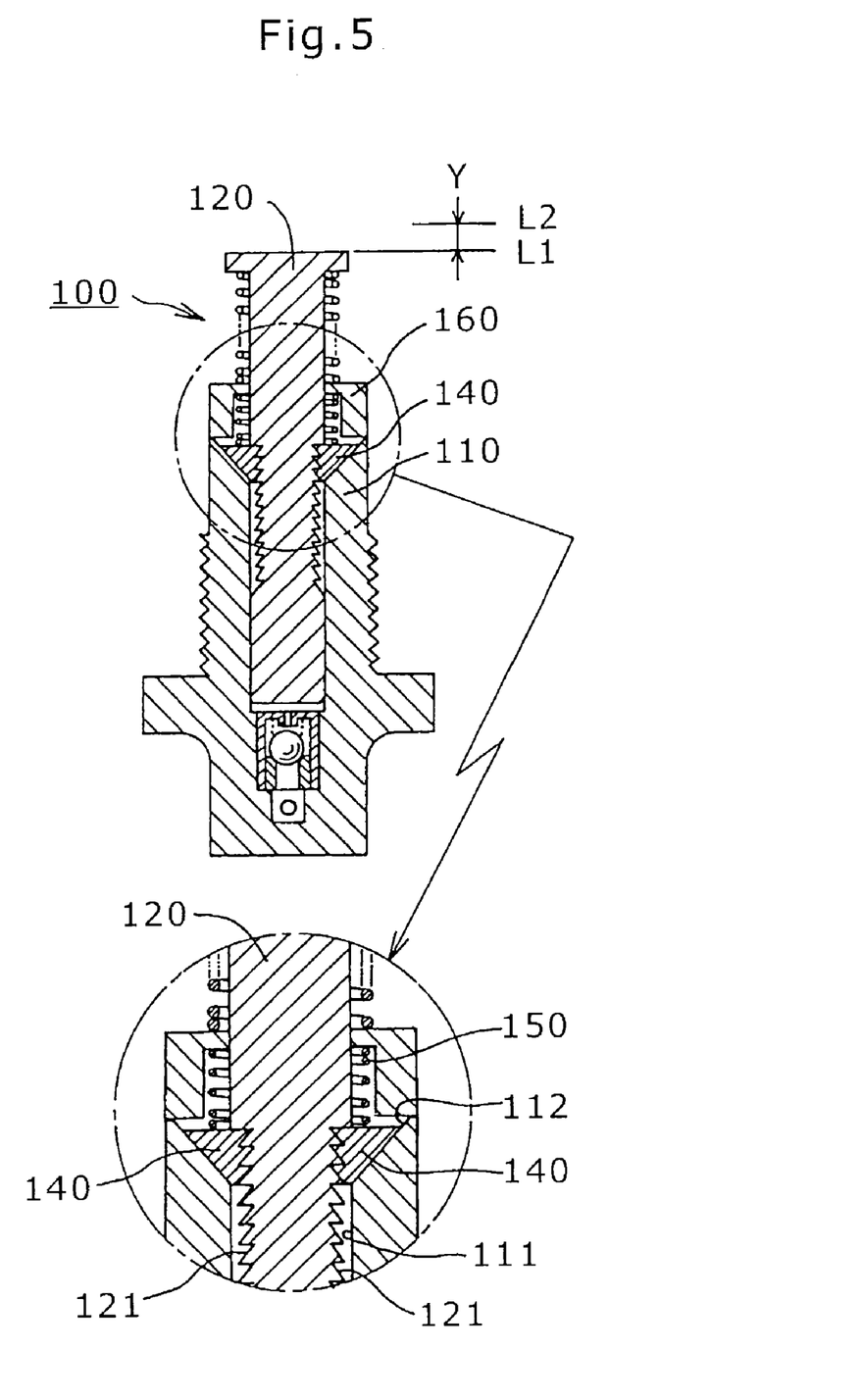
FIG. 5 is a sectional view of the tensioner, showing the plunger in its fully retracted condition.

Line L1 in FIG. 5 shows the front end position of the plunger 120 when fully retracted. Line L2 in FIGS. 5, 6, and 7 shows the front end position of the plunger 120 just before the cams 140 step over one tooth of each of the racks 121, and line L3 in FIGS. 6 and 7 shows the front end position of the plunger 120 when the plunger 120 has advanced by one tooth of the rack 121, and has then retracted as far as permitted by the cams.

The tensioner 100 can maintain proper chain tension, and can prevent wobbling noise due to wobbling of the chain upon starting of an engine, and whistling sounds due to excess tensioning of the chain caused by excess protrusion of the plunger. Therefore, the effects of the chain tensioner 100 in accordance with the invention are very significant.

The chain tensioner of the invention includes wedge-shaped cams, which engage with racks at opposed positions where the outer circumference of said plunger is divided into at least two parts. Thus, when the chain elongates during the operation of an engine, the plunger sequentially advances by one tooth. Thus, the chain tensioner of the invention always controls a proper backlash distance, and prevents foreign noise generated upon starting of an engine, and whistling sounds resulting from excess tensioning of the chain. As a result, proper chain tension is maintained.

The backlash distances required for various engines can be set freely, and in a wide range, by the appropriate selection of the guide surface angle θ. As a result, wear of the tooth heads, and tooth chipping, which are generated when the backlash distance was controlled by selection of the height h of the plunger rack teeth, can be avoided. Wobbling noise due to wobbling of the chain upon starting of the engine, and whistling sounds, due to excessive tensioning of the chain resulting from excess protrusion of the plunger, can be prevented, and proper chain tension can be maintained.

By rotating the plunger about the axial center of the plunger with respect to the housing, engagement and disengagement between the racks and the cams can be effected. Thus, assembly can be performed easily, and the engagement between the racks and cams can be released in an engine so that maintenance of chain can be performed.

When the protrusion biasing spring is interposed between the front end portion of the plunger and the spacer, the protrusion biasing spring itself can be easily handled, and a strong biasing force can be realized because the spring can have a large diameter. Furthermore, the force exerted by the protrusion biasing spring can maintain the spacer in contact with the front end of the housing surrounding the plunger-receiving hole so that the cam-biasing spring can be supported. Moreover, the spacer can be held in fixed relationship to the housing without the need for a fastener or other special fixing device.

We claim:

1. A tensioner comprising:
   a housing having a plunger-receiving hole, said hole having an opening;
   a plunger slidably fitting into said plunger-receiving hole and protruding from the opening thereof in a protruding direction; and
   a first spring biasing said plunger in said protruding direction;
   toothed racks formed on opposite sides of said plunger;
   a pair of wedge-shaped cams on opposite sides of said plunger, each said cam being disposed adjacent one of the respective toothed racks, each said cam having teeth lockingly engageable with teeth of the adjacent one of said racks to prevent retracting movement of the plunger relative to said cams, and each cam having an oblique surface for engagement with an oblique cam guide surface, said oblique surface of each cam facing outwardly away from said plunger, the shape of each said oblique cam surface being such that the oblique cam surface has an outer end disposed farther along said protruding direction than an inner end thereof;
   a pair of oblique cam guide surfaces formed in said housing on opposite sides of said plunger, the oblique surfaces of the cams conforming to, and being in engagement with said oblique cam guide surfaces and slidable thereon to an extent such that the teeth of the cams can be brought into and out of locking engagement with the teeth of said toothed racks;
   a spacer disposed on the housing adjacent said opening; and
   a second spring engaged with said spacer and said cams, said second spring urging said cams in a direction opposite to said protruding direction whereby the cams are urged into locking engagement with said toothed racks;
   wherein, when the teeth of said racks have a height h, the angle between the oblique cam guide surfaces and the direction of protrusion of the plunger is $\theta$, and the minimum backlash distance of the plunger is X, the cam guide surfaces conform to the relationship $X = h/\tan\theta$, where $15° < \theta < 70°$.

2. A tensioner according to claim 1, in which said plunger is rotatable in said housing, whereby the toothed racks can be engaged with, and disengaged from, the cams by rotation of the plunger.

3. A tensioner according to claim 1, in which said plunger has a front end portion, and said first spring is interposed between the front end portion of the plunger and said spacer.

4. A tensioner according to claim 3, in which said plunger is rotatable in said housing, whereby the toothed racks can be engaged with, and disengaged from, the cams by rotation of the plunger.

5. A tensioner according to claim 3, in which said housing has a front end surrounding said opening of the plunger-receiving hole, and said spacer is pressed against said front end of the housing by said first spring.

6. A tensioner according to claim 5, in which said plunger is rotatable in said housing, whereby the toothed racks can be engaged with, and disengaged from, the cams by rotation of the plunger.

* * * * *